Patented Aug. 14, 1945

2,382,353

UNITED STATES PATENT OFFICE 2,382,353

METHOD OF CHLORINATING RUBBER

Henry L. Tomkinson, Sayreville, N. J., assignor to Hercules Powder Company, Wilmington, Del., a corporation of Delaware No Drawing. Application December 31, 1942, Serial No. 470,833

4 Claims. (Cl. 260—772)

This invention relates to chlorinated rubber and more particularly it relates to chlorinated rubber of improved compatibility with alkyd resins.

In the production of many of the different types of coating compositions containing chlorinated rubber, it is necessary that the chlorinated rubber be compatible with alkyd resins of which the coating compositions are comprised. Little difficulty has been encountered in obtaining the desired compatibility in chlorinated rubbers of low viscosity such as below 15 centipoises. Considerable difficulty has, however, been encountered in obtaining satisfactory compatibility in the higher viscosity products which are used where flexibility is needed.

Chlorinated rubber of above 15 centipoises viscosity has heretofore had a limited tolerance for alkyd resins and conversely alkyd resins have had a limited tolerance for chlorinated rubber. General compatibility permitting formulation of coatings containing high proportions of both, for example, coating compositions with a 1:1 ratio of alkyd resin to chlorinated rubber, has not been obtained. In the few cases in which fair compatibility in the higher viscosities has been obtained, it has not been reproducible from batch to batch. Complete and dependable compatibility, i. e., compatibility in films consisting of equal parts chlorinated rubber and alkyd resins, has been desired for the more flexible chlorinated rubber of above 15 centipoises.

Now in accordance with this invention, chlorinated rubbers having a viscosity of over 15 centipoises and having uniform and improved compatibility with alkyd resins are produced in the following manner:

Rubber is dissolved in a solvent substantially inert to chlorine to form a 1% to 6% solution, and chlorine is passed into the solution. The solution is heated to an elevated temperature, i. e., above 30° C. but below 76° C., by external heat or the heat of reaction and remains at the elevated temperature throughout the chlorination. The chlorine is added at a rate sufficient to heat the solution and preferably at least the rate at which the solution can absorb it. Heat is removed from the solution at the rate required to hold it in the desired temperature range. Chlorination is continued to a point at which a distinct change in the nature of the reaction occurs. The change is clearly indicated by a drop in the rate of chlorine absorbable by the solution, by a drop in the rate of hydrogen chloride evolved by the solution and by a drop in the rate of heat formed by the reaction. Where rate of heat extraction is held substantially constant as the reaction change is reached, there is a drop in temperature of the solution. In some cases, depending on the temperature, there is a sharp change in apparent viscosity due to a change in phase composition of the reaction solution.

Upon reaching the change in reaction characterized by the drop in heat evolution, a gas containing free oxygen is passed into the mass concurrently with chlorine. It is essential in the process of this invention, that chlorine be passed into the solution concurrently with the oxygen. Addition of oxygen has the known effect of reducing viscosity. In the present process, the oxygen is added at such a rate that the viscosity is reduced to the desired level, above 15 centipoises and usually below 28 centipoises, before completion of the chlorination and addition of oxygen must be discontinued prior to completion. The addition of chlorine alone is then continued until the desired chlorine content is attained at a level of at least 64%.

The improvement in compatibility obtained in the present invention is brought about by the continued chlorination with chlorine free of oxygen after the treatment concurrently with oxygen and chlorine has been completed. This critically essential treatment with chlorine alone must be sufficient to add at least 2% to the chlorine content of the chlorinated rubber and will be discontinued only at a point at which the chlorine content of the chlorinated rubber is at least 64%.

Having described in a general way the nature of this invention, the following examples are given to more fully illustrate its specific operation.

Example 1

A batch of 400 grams of milled crepe rubber was dissolved in carbon tetrachloride in a jacketed, closed vessel provided with agitator and suitable gas inlets and outlets, the amount of the solvent being such as to give a 3.5% concentration of rubber in solution. The temperature of the solution was raised to 70° C. and chlorine was added, with cooling and temperature control at 70° C. by use of water in the vessel jacket, at the rate of 250 grams per hour for four hours. At the end of four hours, the temperature suddenly dropped to 66° C. At this point the chlorine flow was cut to 100 grams per hour and the mixture was also subjected to a current of air which flowed through the rubber mass at an average rate of 16.8 grams per hour. The addition of the air and chlorine together was continued without interruption until the chlorinated rubber obtainable from the mass upon completion of the chlorination had a viscosity of 22 centipoises. The chlorinated rubber attained this viscosity after the addition of chlorine and air had been continued for 2¼ hours. At this point, the addition of air was discontinued. The flow of chlorine was increased to 200 grams per hour and was gradually decreased again until at the end of the chlorination process (when the chlorinated rubber had a chlorine content of 67% by weight) the flow had been reduced to 75 grams per hour. The chlorinated rubber was then recovered by immediate precipitation with boiling water, washing and drying. The material had a viscosity of 22 centipoises and was compatible with alkyd resins.

Example 2

Another chlorinated rubber of excellent compatibility and of comparatively high viscosity was produced in much the same manner as described in Example 1. In this case, however, the chlorine treatment of the 3.5% concentrated solution of 400 grams milled rubber in carbon tetrachloride was carried on at a temperature of 65° C. instead of 70° C. When the chlorine had been added at the rate of 250 grams per hour for four hours, the temperature of the treating solution suddenly dropped to 60° C. At this point, as in Example 1, the chlorine flow was cut to 100 grams per hour and air was added concurrently at the rate of 16.8 grams per hour until the chlorinated rubber obtainable from the completely chlorinated mass had a viscosity of 25 centipoises. The total time of the concurrent addition of air and chlorine required to lower the viscosity was two hours. The addition of air was then discontinued and the chlorine flow was increased to 200 grams per hour. The rate of chlorine flow was gradually reduced until the chlorination was complete. The final chlorinated rubber had a chlorine content of 67.5% by weight. By the time the chlorination was complete, the chlorine flow had been reduced to 75 grams per hour. The product had a viscosity of 25 centipoises and wide compatibility with alkyd resins.

Example 3

The chlorinated rubber prepared in this example was prepared in the same manner as in Example 1, except that the chlorination was carried out at 55° C. instead of at 70° C. It was carried out on a batch of the same size and type as there used. The chlorine was added at the rate of 250 grams per hour for 3½ hours when the temperature dropped suddenly to 52° C. At this point, the chlorine flow was reduced to 100 grams per hour and air was added concurrently with the chlorine without interruption until the viscosity of the chlorinated rubber obtainable from the mass upon completion of chlorination was 26 centipoises. The time required for the concurrent addition of air and chlorine was 2 hours. When the desired viscosity was achieved, the addition of air was discontinued and the chlorination continued. The chlorine flow was increased to 200 grams per hour and then gradually decreased again. When the chlorinated rubber had a chlorine content of 66.5% by weight, the chlorination was discontinued. At the time when the chlorination was discontinued, the chlorine flow had been reduced to 75 grams per hour. The product had a viscosity of 24 centipoises and wide compatibility with alkyd resins.

Example 4

The chlorinated rubber prepared in this example was prepared at 50° C. The chlorine was passed through a 3.5% solution of 400 grams of the rubber in carbon tetrachloride at the rate of 250 grams per hour, for 3½ hours at this temperature. At the end of 3½ hours, the temperature of the rubber solution suddenly dropped sharply to 47° C. At this point as in the other examples, the chlorine flow was cut to 100 grams per hour and a flow of air was added concurrently at the rate of about 16.8 grams per hour until a viscosity of 25 centipoises was attained for final chlorinated rubber obtainable from the mass. The air and chlorine were added concurrently for a period of 1¾ hours. When the chlorinated rubber had attained the desired viscosity, the addition of air was discontinued and the flow of chlorine was increased to 200 grams per hour. The chlorine flow was gradually decreased again until it had been reduced to 75 grams per hour. The chlorination process was discontinued when the chlorinated rubber had a chlorine content of 68.0% by weight. The product had a viscosity of 24 centipoises.

The chlorinated rubber products of the examples were tested for compatibility each separately with the following alkyd resins which are believed to be glycerol phthalate condensates with fatty oil acid or resin acid modification, and found to be completely compatible in the 1:1 ratio:

Duraplex C-45  Rezyl 829
Duraplex C-48  Glyptal 2454
Rezyl 412  Bakelite XR3180
Rezyl 807  Amberol 801

The products were also found to be compatible with methacrylate polymers in the same manner.

The resins were combined with the chlorinated rubbers by dissolving equal parts of the chlorinated rubber and the alkyd resin in xylol and permitting a film to dry therefrom. Both solution and film must be homogeneous with freedom from blushing, clouding or separation for compatibility. The product of the process according to this invention is characterized by complete compatibility in 1:1 ratio with drying type drying oil acid modified glycerol phthalate alkyd resins, "Rezyl 807" serving satisfactorily for test purposes.

Although the above examples have shown that the process in accordance with this invention may be carried out at temperatures of 50–70° C., and indeed it may successfully be used at temperatures as low as 30° C. and as high as 76° C., it is preferred to carry out the treatment at temperatures above 60° C. As disclosed in U. S. Patent 2,182,456, when the chlorination process is carried on at temperatures below 63° C., at a certain point in the chlorination, the chlorinated rubber solution forms two different phases, with syneresis and a drop in temperature. This change in phase composition, and its accompanying drops in heat evolution, in hydrogen chloride evolution, and in chlorine absorbing power, indicates the critical point of reaction following which the addition of oxygen with chlorine is effective to obtain the desired results of the present process.

It has been found that when chlorination is carried out at temperatures about 63° C., although no "break" occurs, there are other phenomena which indicate the proper period during which oxygen is added. When the chlorination is carried on at temperatures above 63° C., although no "break" occurs, the drop in heat evolution and reactivity and the drop in temperature previously mentioned indicate the change in the reaction. Thus, at this critical point, the mass under chlorination with cooling suddenly drops several degrees in temperature and nearly ceases to evolve hydrochloric acid which up till this point had been given off in large volume. The rate of chlorine absorbed from an excess of chlorine also drops sharply. There is no apparent change in physical state of the solution.

The temperature drop and the other changes occur when the chlorine content of the chlorinated rubber is between 45% and 59% of the total weight of the product, usually between 48% and 55%. Thus, even when the chlorination is carried on at temperatures above 63° C. where no "break" occurs, the most advantageous time for beginning addition of the oxygen is determinable in accordance with this invention by a decrease in heat evolution which is indicated by a temperature drop under conditions of substantially constant cooling, by a decrease in rate of chlorine absorbed, and by a decrease in evolution of hydrogen chloride. The addition of oxygen containing gas is best started immediately or shortly after the temperature drop.

The period during which oxygen (which may be in the form of air) is added will vary anywhere from five minutes to eight hours and usually will be from about one hour to three hours. Thus, for example, it will vary with the temperature at which the process is carried out, the rate of oxygen and chlorine flow, and the viscosity level desired, and the viscosity of the rubber.

The rate of flow of chlorine into the solution will usually vary during the different stages of the chlorination procedure as seen in the examples. Thus, the flow may be as high as 250 parts by weight per hour or as low as one part by weight per hour for each 100 parts by weight of rubber. In general, chlorine is added at the rate at which it can be consumed at the particular stage and under the particular reaction conditions involved, or in small excess thereover.

The flow of air may be varied widely. Ratios between about 0.15 and about 30 parts by weight per hour per 100 parts by weight of rubber have been found suitable. Best results are obtained at air rates between 0.15 and 4.5 parts per hour per 100 parts rubber. Where a source of oxygen richer in oxygen than air is used, the rates may be lower to obtain an oxygen supply equivalent to that in air. Thus for pure oxygen the rate is one-fifth of that for air.

It has been mentioned that the oxygen containing gas should be added concurrently with a flow of chlorine. This is essential to insure obtaining a product compatible with fatty oil acid modified alkyd resins. Chlorine should be added at all times air or oxygen is being added at a rate at least twice that of the oxygen by weight based on pure oxygen. Continuous addition of the air or oxygen for the entire period of addition is highly desirable. Any interruption of either gas adversely affects compatibility and hence is avoided. However, the adverse effect is minimized if an interruption, as for sampling, is of both chlorine and oxygen, taking care that all addition of the two gases is concurrent between the beginning and end of oxygen treatment.

It has also been found that addition of air or other form of oxygen must be discontinued before the end of the chlorination to obtain uniform compatibility. Thus sufficient air must be added during the critical period to bring the viscosity of the chlorinated rubber to the desired level before the chlorination has been completed. The desired level is indicated by the reaction dope viscosity which has a readily determined relation to the final product viscosity at any given concentration and temperature at this stage of the reaction. Addition of air must be complete at a point at which the chlorinated rubber has a chlorine content at least 2% less than the chlorine content of the final product; for widest compatibility addition of air should be complete when the material has at least 5% less chlorine than its ultimate product. Oxygen addition will be discontinued before the chlorine content reaches 65% and chlorination is continued until a chlorine content at least 2% higher and between about 64% and about 70%, in some few cases as high as about 75%, is reached. Chlorination during the period following the critical reaction change point hereinabove described is relatively slow. However, after a time a reversal of the change occurs. The mixture regains its reactivity and chlorination to above 64%, which is necessary to obtain a stable and compatible product, is then readily achieved.

In place of air, gases of higher oxygen content may be used. Thus, oxygen or ozone may be used. It is to be understood that when gases containing a higher oxygen content than air are used, the treatment will require less time or the rate of flow of oxygen containing gas will be reduced proportionately.

Although it is preferred to use carbon tetrachloride as the solvent for the rubber to be chlorinated, other solvents may be used. Thus, for example, benzene, chloroform and ethylene dichloride have been found suitable.

The rubber utilized may be white crepe, smoked sheet or the like. Preferably, it is milled or otherwise treated to improve solubility. Preferably, it is first digested, for example, as described in the J. M. Peterson U. S. Patent 2,252,728 to improve its suitability for chlorination.

It is to be understood that this process will be applied to produce chlorinated rubbers having a viscosity of more than 15 centipoises. Other processes may be used to produce uniformly high compatibility chlorinated rubbers if the viscosity is thereby reduced below 15 centipoises. Chlorinated rubbers with viscosities of above 15 centipoises, which are prepared in accordance with this invention, will have a dependable and uniformly high degree of compatibility with a wide range of alkyd resins not attainable heretofore. The greatest compatibility with the widest range of alkyds will be obtained if the process in accordance with this invention is employed to produce chlorinated rubbers with viscosities of less than 28 centipoises, preferably 20–27 centipoises. The process may, nevertheless, be advantageously applied in producing chlorinated rubbers with viscosities of over 28 centipoises as they will have a higher degree of compatibility although not complete compatibility with alkyd resins than chlorinated rubbers produced by other methods known to the art.

The combination of higher viscosities and higher compatibility with alkyd resins possessed by chlorinated rubbers prepared in accordance with this invention is of value in preparing coating compositions in which appreciable proportions of both chlorinated rubber and alkyd resins are desired. Previously only very low viscosity chlorinated rubber, which is less flexible, could be used.

The viscosities of the products referred to in this specification and in the claims appended thereto are measured in a 20% by weight solution in toluene at 25° C.

What I claim and desire to protect by Letters Patent is:

1. A process of producing chlorinated rubber of a viscosity above 15 centipoises and below 28 centipoises and of improved compatibility with alkyd resins which comprises dissolving rubber in an organic solvent substantially inert to chlorine; passing chlorine gas into the solution thus obtained with the solution at 30-76° C. until the chlorine content of the partially chlorinated rubber is between about 45% and about 59% and there occurs a sudden drop in the rate of heat evolution by the reaction with an accompanying decrease in the rate of reaction of the chlorine, indicating a change in the nature of the reaction; passing gas containing free oxygen into the solution concurrently with chlorine during a period following the said reaction change until the viscosity of the chlorinated rubber recovered from the solution is reduced thereby to the desired value above 15 centipoises but below 28 centipoises, the rate of chlorine addition during the period of concurrent addition with oxygen being substantially reduced as compared with its previous rate of addition and being approximately that at which the chlorine can be absorbed by the rubber solution, the rate of chlorine addition during the period of concurrent addition with oxygen being at all times at least twice that of the oxygen by weight based on pure oxygen, the rate of oxygen addition being sufficiently high to reduce the viscosity to the value desired before chlorination has been completed; discontinuing addition of the gas containing free oxygen; and continuing addition of chlorine alone until the chlorinated rubber is increased in its chlorine content by a minimum of 2% to a content in excess of 64% but not above 75% and chlorination to the desired extent is completed.

2. A process of producing chlorinated rubber of a viscosity above 15 centipoises and below 28 centipoises and of improved compatibility with alkyd resins which comprises dissolving rubber in carbon tetrachloride; passing chlorine gas into the solution thus obtained while maintaining the solution at 30-76° C. until the chlorine content of the partially chlorinated rubber is between about 45% and about 59%, and there occurs a sudden drop in rate of heat evolution with an accompanying decrease in the rate of reaction of the chlorine, indicating a change in the reaction; passing air through the solution concurrently and continuously with chlorine during a period following the said reaction change until the viscosity of the chlorinated rubber recovered from the solution reaches the desired value between 15 and about 28 centipoises, the rate of chlorine addition during the period of concurrent addition with air being substantially reduced as compared with its previous rate of addition and being approximately that at which the chlorine can be absorbed by the rubber solution, the rate of chlorine addition during the period of concurrent addition with air being at all times at least twice that of the oxygen in the air by weight, the rate of air addition being sufficiently high to reduce the viscosity to the value desired before the chlorinated rubber reaches a chlorine content of 64% and before chlorination has been completed; discontinuing addition of the air; continuing addition of chlorine until the chlorine content of the chlorinated rubber has been increased a minimum of 2% to between 64% and 75%; and recovering the resulting chlorinated rubber from the solution.

3. A process of producing chlorinated rubber of a viscosity above 15 centipoises and below 28 centipoises of improved compatibility with alkyd resins which comprises dissolving rubber in carbon tetrachloride; passing chlorine gas into the solution thus obtained, while extracting heat and thereby holding the temperature of the solution substantially constant at between 30° C. and 76° C. during the major portion of a first stage of reaction, until the chlorine content of the partially chlorinated rubber is between about 45% and about 59% and a sudden drop in temperature accompanied by a drop in ability to absorb chlorine indicates the end of the first reaction stage; passing gas containing free oxygen through the solution continuously and concurrently with chlorine during a period substantially immediately following the end of the first stage until the viscosity of the chlorinated rubber recovered from the solution is between 15 and about 28 centipoises, the rate of chlorine addition during the period of concurrent addition with oxygen being substantially reduced as compared with its previous rate of addition and being approximately that at which the chlorine can be absorbed by the rubber solution, the rate of chlorine addition during the period of concurrent addition with oxygen being at all times at least twice that of the oxygen by weight based on pure oxygen, the rate of oxygen addition being sufficiently high to reduce the viscosity to the desired level before the chlorinated rubber has a chlorine content of 64% and before chlorination has been completed; discontinuing the addition of the gas containing free oxygen; and continuing addition of chlorine until the chlorine content of the chlorinated rubber has increased a minimum of 2% to between 64% and 75%.

4. A process of producing chlorinated rubber of a viscosity between about 20 and 27 centipoises and of improved compatibility with alkyd resins which comprises dissolving rubber in carbon tetrachloride; passing chlorine gas into the solution thus obtained, while extracting heat and thereby holding the temperature of the solution substantially constant at between 60° C. and 70° C. during the major portion of a first stage of reaction, until the chlorine content of the partially chlorinated rubber is between about 45% and about 59% and a sudden drop in temperature accompanied by a drop in ability to absorb chlorine indicates the end of the first reaction stage; passing air into the solution at a rate between about 0.15 and about 30 parts by weight per hour per part of rubber, concurrently with chlorine during a period immediately following the end of the first reaction stage until the viscosity of the chlorinated rubber recovered from the solution is between 20 and about 27 centipoises, the rate of chlorine addition during the period of concurrent addition with air being substantially reduced as compared with its previous rate of addition and being approximately that at which the chlorine can be absorbed by the rubber solution, the rate of chlorine addition during the period of concurrent addition with air being at all times at least twice that of the oxygen in the air by weight, the rate of air addition being sufficiently high to effect the drop to the desired viscosity level before the chlorine content of the chlorinated rubber reaches 64%; discontinuing the addition of air, continuing the addition of chlorine at a rate at least as high as the rate at which it can be absorbed until the chlorine content of the chlorinated rubber has increased at least 2% and has reached a value between 64% and 70%, and recovering the chlorinated rubber from the solution.

HENRY L. TOMKINSON.